United States Patent
Schulte et al.

(10) Patent No.: US 7,530,080 B2
(45) Date of Patent: May 5, 2009

(54) IMPLEMENTATION OF ALIAS PRESERVING STRUCTURAL SUBTYPING WITH PRECISE TYPES USING TRANSPARENT ADAPTERS

(75) Inventors: Wolfram Schulte, Bellevue, WA (US); Barend H. Venter, Issaquah, WA (US); Chia-Hsun Chen, Redmond, WA (US); Erik Meijer, Mercer Island, WA (US); Christopher J. Lovett, Woodinville, WA (US); Matthew J. Warren, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 915 days.

(21) Appl. No.: 10/395,973

(22) Filed: Mar. 25, 2003

(65) Prior Publication Data

US 2004/0194117 A1    Sep. 30, 2004

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/330; 719/313; 719/320

(58) Field of Classification Search .............. 717/114, 717/140; 719/328, 330, 313, 320
See application file for complete search history.

(56) References Cited

U.S. PATENT DOCUMENTS

| 5,864,862 | A | * | 1/1999 | Kriens et al. ............. 707/103 R |
| 6,578,192 | B1 | | 6/2003 | Boehme et al. |
| 6,585,778 | B1 | | 7/2003 | Hind et al. |

OTHER PUBLICATIONS

S. Finne, D. Leijen, E. Meijer, S. Peyton Jones. "H/Direct: A Binary Format Language Interface for Haskell". ACM SIGPLAN Notices, Precedings of the Third ACM SIGPLAN International Conference on Function Programming; ICFP '98, vol. 34, Issue 1.*

(Continued)

*Primary Examiner*—Li B Zhen
*Assistant Examiner*—Qing-Yuan Wu
(74) *Attorney, Agent, or Firm*—Amin, Turocy & Calvin, LLP (57) ABSTRACT

A system and method for employing a programming language based on structural types on top of a nominal type runtime environment is disclosed. The system utilizes adapters and coercive subtyping to achieve precise typing while preserving aliasing. Furthermore, the system employs a universal value representation to achieve cross-assembly type equivalence.

6 Claims, 7 Drawing Sheets

OTHER PUBLICATIONS

V. Breazu-Tannen, T. Coquand, C. A. Gunter, and A. Scedrov, Inher S. Peyton Jones, E. Meijer, and D. Leijen. "Scripting COM components in Haskell." Fifth International Conference on Software Reuse, 1998.*

E. Meijer and S. Finne. "Lambada, Haskell as a better Java", Electronic Notes in Theoretical Computer Science 41, No. 1; Aug. 2001.*

Meijer and Finne (Meijer, E. and Finne, S. "Lambada, Haskell as a better Java", Electronic Notes in Theoretical Computer Science 41, No. 1; Aug. 2001.*

Finne et al., "Calling hell from heaven and heaven from hell," 1999, ICFP, pp. 1-12.*

M. Ostendorf, V. Digalakis, and O. A. Kimball, From HMMs to Segment Models: A Unified View of Stochastic Modeling for Speech Recognition, , Oct. 31, 1995, 3 Pages. itance and Explicit Coercion, 1989, Ieee, pp. 112-129.

Benjamin C. Pierce. Types and Programming Languages. The MIT Press, Cambridge, Massachusetts, 2002.

W3C.ORG. XQuery 1.0: An XML Query Language. W3C Working Draft, May 2, 2003. http://www.w3.org/TR/xquery, May 2, 2003.

Tadeusz Pankowski. XML-SQL: An XML Query Language based on SQL and Path Tables, 2002, 15 pages.

Taurai Tapiwa Chinenyanga and Nicholas Kushmerick. An Expressive and Efficient Language for XML Information Retrieval. Journal of the American Society for Information Science and Technology. Jun. 5, 2001, 30 pages.

Erik Meijer and Mark Shields. XMLambda: A Functional Language for Constructing and Manipulating XML Documents. USENIX Annual Technical Conference, 2000, 13 pages.

Yuri Leontiev, M. Tamer Ozsu, and Duane Szafron. On Type Ssytems for Object-Oriented Database Programming Languages. ACM Computing Surveys, vol. 34 No. 4, pp. 409-449, Dec. 2002.

Luca Cardelli and Peter Wegner. On Understanding Types, Data Abstraction, and Polymorphism. Computing Surveys, vol. 17 No. 4, Dec. 1985, pp. 471-522.

Martin Buchi and Wolfgang Weck. Compound Types for Java. ACM, 1998, pp. 362-373.

Dan Suciu, Semistructured Data and XML, AT&T Labs, In Proceeding of International Coference of Data Organzation, 1998, 13 pages.

Peter Buneman. Semistructured Data, Army Research Office and National Science Foundation, 1997, 5 pages.

Erik Meijer and John Gough. Technical Overview of the Common Language Runtime, In Proceedings PLDI, 2001, 11 pages.

M. Hostetter, D. Kranz, C. Seed, C. Terman, and S. Ward. Curl: A Gentle Slope Language for the Web. World Wide Web Journal, 11(2), 1997. http://www.w3j.com/6/s3.kranz.html, 16 pages.

* cited by examiner

IMPLEMENTATION OF ALIAS PRESERVING STRUCTURAL SUBTYPING WITH PRECISE TYPES USING TRANSPARENT ADAPTERS

TECHNICAL FIELD

The present invention relates generally to computer systems, and more particularly to employing adapters to implement structural subtyping in a nominal type runtime environment.

BACKGROUND

The exponential developments in computer hardware over the past several decades have spawned increasing complexity in computer programs. Computer hardware, specifically computer chips, have held strong to Moore's Law, doubling in computing power every eighteen months. We have gone from room size computers, to small 8-bit computer chips with only a few thousand transistors to the technology of today that includes 64-bit chips packed with almost 50 million transistors. We have moved from a time when 8 bits was quite a large amount of memory to a time where 256 megabytes of memory and 50 gigabyte storage mediums are common. As the trend continues we will see a continued devotion to the exponential growth of computer hardware including computer chips which will have billions of nanometer sized transistors and storage mediums capable of holding terabytes of information. This means that computer programs will continue to grow even larger and more complex, than the programs of today, in order to meet and exceed the functional desires and expectations of businesses and consumers. However, increasing programmatic size and complexity has a cost and that cost is measured in terms of reliability.

Due to the increasingly complex nature of software systems programmers have been riddled by undetectable programmatic errors that sometimes do not manifest themselves until it is too late. Developers continue to try and expand the power of programming languages by incorporating increasingly complex mathematical and philosophical concepts. Additionally, the software market is becoming increasingly platform independent and service oriented. Combining powerful object-oriented programmatic concepts into a new data centric and service based world causes programmers problems as they try and piece together the best parts of a multitude of different technologies in an ad hoc fashion.

Type systems are a formal mechanism for ensuring that typed programs perform correctly and in a well-behaved manner. Typed programs or typed systems are generally programs or systems that assign types to variables (e.g., Boolean, integer, real, etc.) or objects. Types are classifications of data that describe how a programmer wants to use the data and how a compiler should interpret such data. However, many functions are only defined to work on particular types (e.g. integer addition or floating point addition). If a given function is defined to work with a certain data type and it receives a different type of data, a type error will be produced. A type system can prevent certain execution errors by utilizing a type-checking algorithm to determine whether a program is well behaved or ill behaved. This process is referred to as type checking. Type checking allows for early detection and therefore correction of errors that may often go undetected by programmers. If such errors are left uncorrected they may lurk in the code, only to become manifestly obvious at a most inopportune time.

In general there are two varieties of type systems—nominal and structural. A nominal type system is a system in which type names are used to determine whether types are equivalent. In a structural type system, names are not essential, because types are said to be equivalent if they have the same structure, as the name suggests. For example, assume Type A=string of integers (1 . . . 10) and Type B=string of integers (1 . . . 10). Further assume that a is of Type A, b is of Type B, and the expression a=b is written into the same program. Under a nominal type system this expression would produce an error because a and b are of different types. However, under a structural type system such an assignment would be legal because the types are equivalent.

Presently there is a significant problem for developers who wish to employ a structural type language. As mentioned supra, in the current day and age, the software industry is moving toward becoming a web service oriented industry. Thus, uniformity in data formats (e.g., extensible markup language (XML)) and platform independent programs are becoming vitally important. However, the underlying architectures that provide for platform independent program execution (e.g., Java Virtual Machine (JVM) and Common Language Runtime (CLR)) have nominal type systems. Therefore, a problem exists concerning how to implement a structural typing, on top of a nominal type system.

SUMMARY OF THE INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

Structural types allow a more precise description of types. Thus, more errors can be detected at compile time than using nominal types. The present invention allows structural typing rules to be run on top on a nominal type system. This is accomplished by employing an adaptor as a common interface for types. The adapter thereby allows a structural type to be implemented in a nominal runtime environment.

Furthermore, subtyping is often employed as a type rule to validate operations on an object or value. Therefore, a type checker may cast a value of one type to another type to determine whether a subtype relation exists. The present invention provides for coercive subtyping to support casting at the source or program level. Coercive subtyping inserts explicit coercions between representation types in a runtime environment whenever a source type is cast. In particular, when a source type is ascribed to another type, the adapter wraps the target system value, a wrappee, and explicitly coerces the type in accordance with the source system cast. In addition, to preserve an illusion that casting maintains reference identity, all side-effecting operations are performed on the wrappee so that side effects are shared between all wrappers of the same wrappee.

Finally, the wrapper employed can be part of a universal representation type that represents a family of types to which the source system type value and its ascribed value are members. Employing a universal representation type thereby allows cross-assembly type equivalence.

To the accomplishment of the foregoing and related ends, certain illustrative aspects of the invention are described herein in connection with the following description and the annexed drawings. These aspects are indicative of various ways in which the invention may be practiced, all of which are intended to be covered by the present invention. Other advantages and novel features of the invention may become apparent from the following detailed description of the invention when considered in conjunction with the drawings.

DETAILED DESCRIPTION

The present invention is now described with reference to the annexed drawings, wherein like numerals refer to like elements throughout. It should be understood, however, that the drawings and detailed description thereto are not intended to limit the invention to the particular form disclosed. Rather, the intention is to cover all modifications, equivalents, and alternatives falling within the spirit and scope of the present invention.

As used in this application, the terms "component" and "system" are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Figure 1:
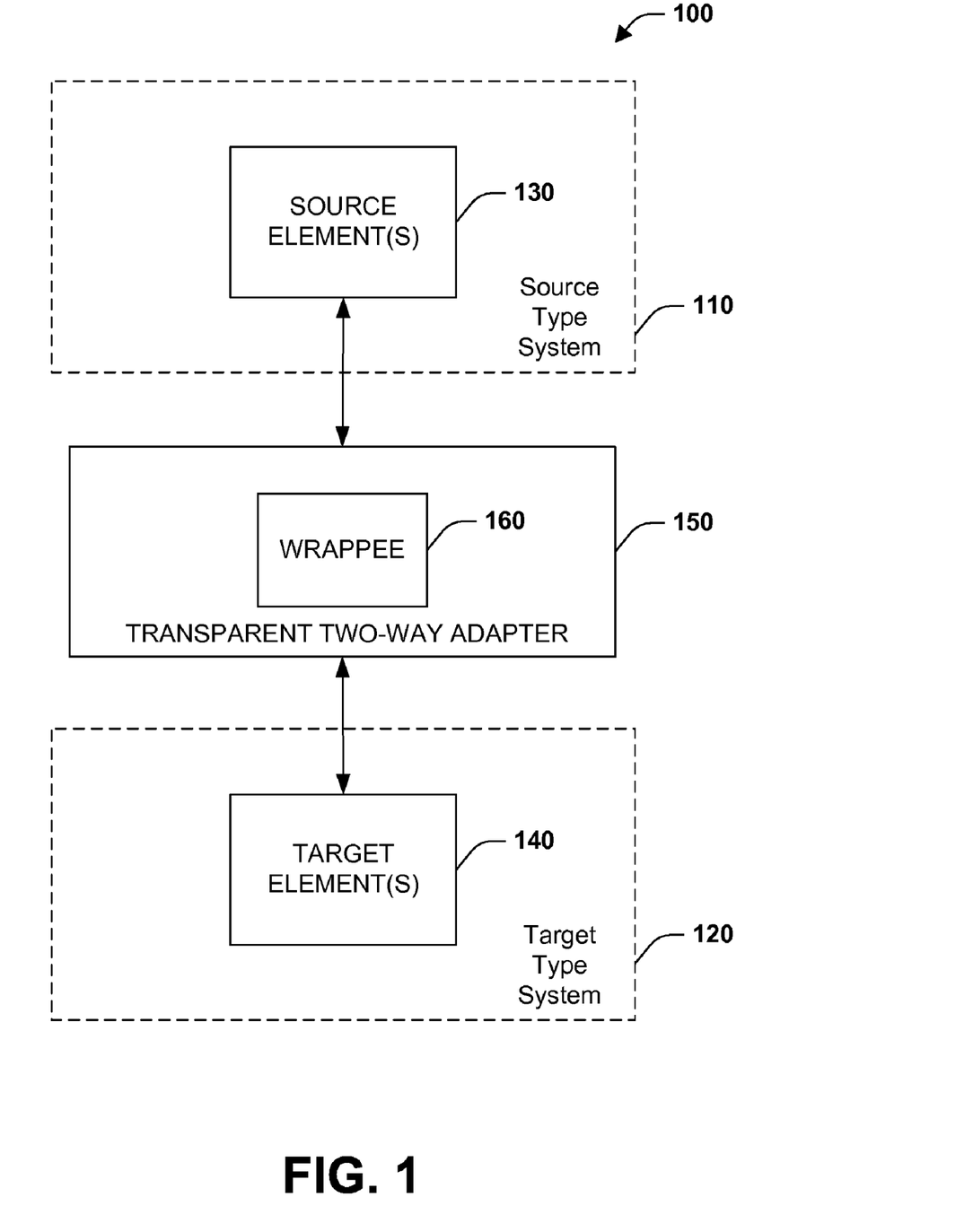
FIG. 1 is a block diagram illustrating a type system interface in accordance with an aspect of the present invention.

Referring initially to FIG. 1, a block diagram is illustrated depicting an interface system 100 facilitating type system communication. System 100 comprises source type system 110, target type system 120, source element(s) 130, target element(s) 140, adapter(s) 150, and object(s) 160. Source element(s) 130 are contained within source type system 110. Source type system 110 corresponds to a language type system employing structural typing. Employing structural typing in a programming language has several benefits over nominal typing. First, a structural language is more eloquent, which improves readability initially during a developmental process and later during maintenance processes. In addition, structural typing allows a programming language to be described much more precisely than in a nominal type system. This is beneficial at least because the more precise a language can be described the more errors a type checker can detect. Thus, a structural language can be developed which is less error prone than an equivalent nominal type language. Target type system 120 relates to a runtime environment in which programs are executed (e.g., Common Language Runtime (CLR), Java Virtual Machine (JVM), etc.). The target system 120 according to the present invention employs nominal typing. Source element(s) 130 include objects, variables, values and the like, specified in a programming language. Target element(s) 140 includes representations of source element(s) 130 in a runtime environment.

Transparent two-way adapter 150 (also referred to as a wrapper) receives via various components source element(s) 130 and target element(s) 140, and provides an interface between the source element(s) 130 and target element(s) 140, which reside in oppositely typed systems. For instance, if source element(s) 130 are designed using a structural type system and the target element(s) 140 are implemented using a nominal type system, then the transparent two-way adapter 150, transparently facilitates communication between the two type systems. More specifically, transparent two-way adapter 150 permits changes in a source element(s) 130 to be effectuated in its associated target element 140. Transparent two-way adapter 150 comprises a wrappee 160. Wrappee 160 is essentially a copy of source element(s) 130 and its essential information such as the element's type and memory pointer.

Adapter 150 also facilitates the use of aliases. An alias is an alternative name for an object or variable or in this case what has been referred to as source element(s) 130. For example, in the following code snippet, x and y are aliases.

[int]^x=[7]
[int]^y=x;
y[0]=15;

The code states that x is a reference to sequence of integer n with one element. The sequence x is then assigned the value 7. Next, y is declared as a reference to sequence of one integer and is assigned the value x. At this point, x and y are aliases of equal value. Then, y[0] is assigned the value 15. Since x and y are aliases, the update of y should also simultaneously initiate an update of x. Therefore, x[0] should also equal 15. The adapter 150 makes the use of aliases possible by storing an element pointer. Where two or more objects or elements are aliases, they simply have a pointer pointed at the same memory location. Therefore, if one object changes the value, its alias can observe that change.

Figure 2:
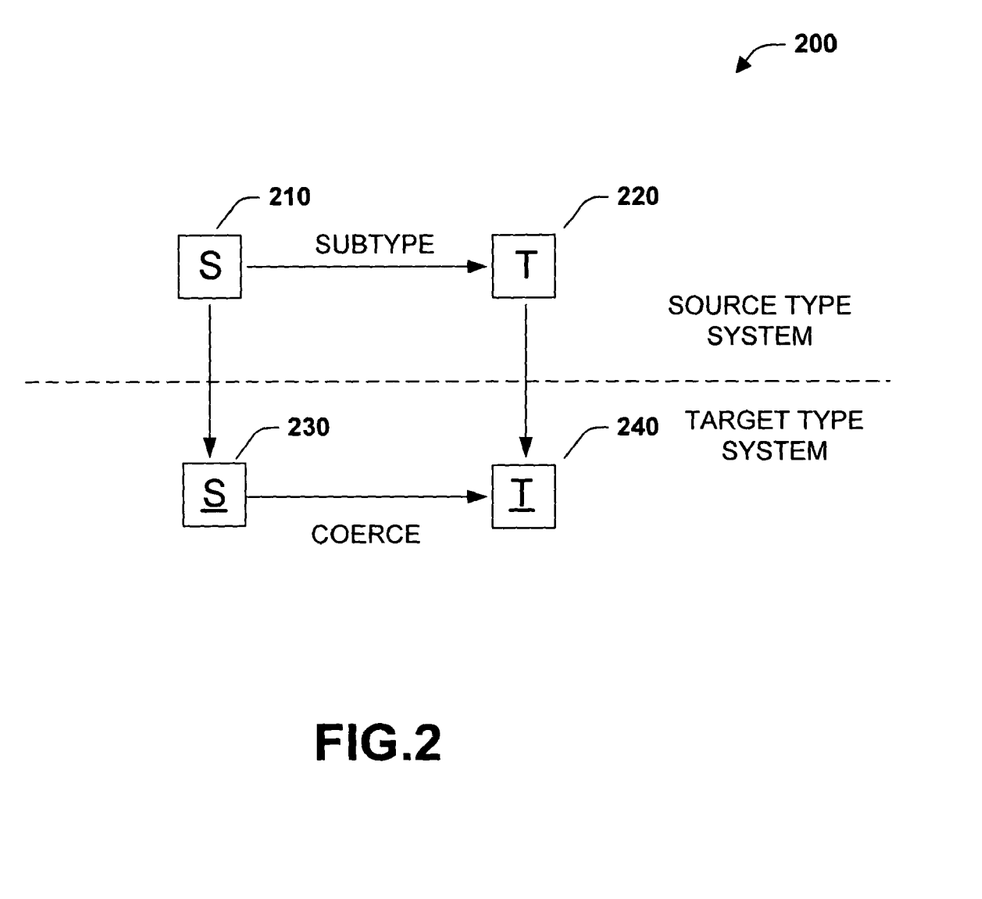
FIG. 2 is a schematic block drawing depicting a system employing coercive subtyping in accordance with an aspect of the present invention.

FIG. 2 illustrates a schematic drawing depicting a system 200 employing coercive subtyping. System 200 includes S 210, T 220, S 230, and T 240. Subtyping is often employed by a type checker to validate operations. The rule generally states that if A<: B then values of A can be utilized where values of B are expected. Therefore, if an operation attempts to add a Boolean value and an integer, a typing error would be produced because Boolean is not a subtype of integer or vice versa. However, if an operation adds a float and an integer, this would most likely be allowed by the type checker, because int<: float and int can be up-cast to float.

Values as represented on the target type system need not be related in any manner; therefore, it is up to the source type system to allow source elements to be represented properly on an underlying system. Hence, if an element has type S 210 which is up-cast to supertype T 220, during the compilation process (e.g., by a type checker), then that particular element casting information also needs to be updated in the target system. Updating the target system can be accomplished via explicit coercion. Thus, if S 210 is ascribed to T 220, the corresponding target system representation element S 230 must also be explicitly coerced to the corresponding source system type T 240. The explicit coercion thus defines a relationship between representation types S 230 and T 240, which can be implemented using the adapter(s) or wrapper(s) described supra.

Figure 3:
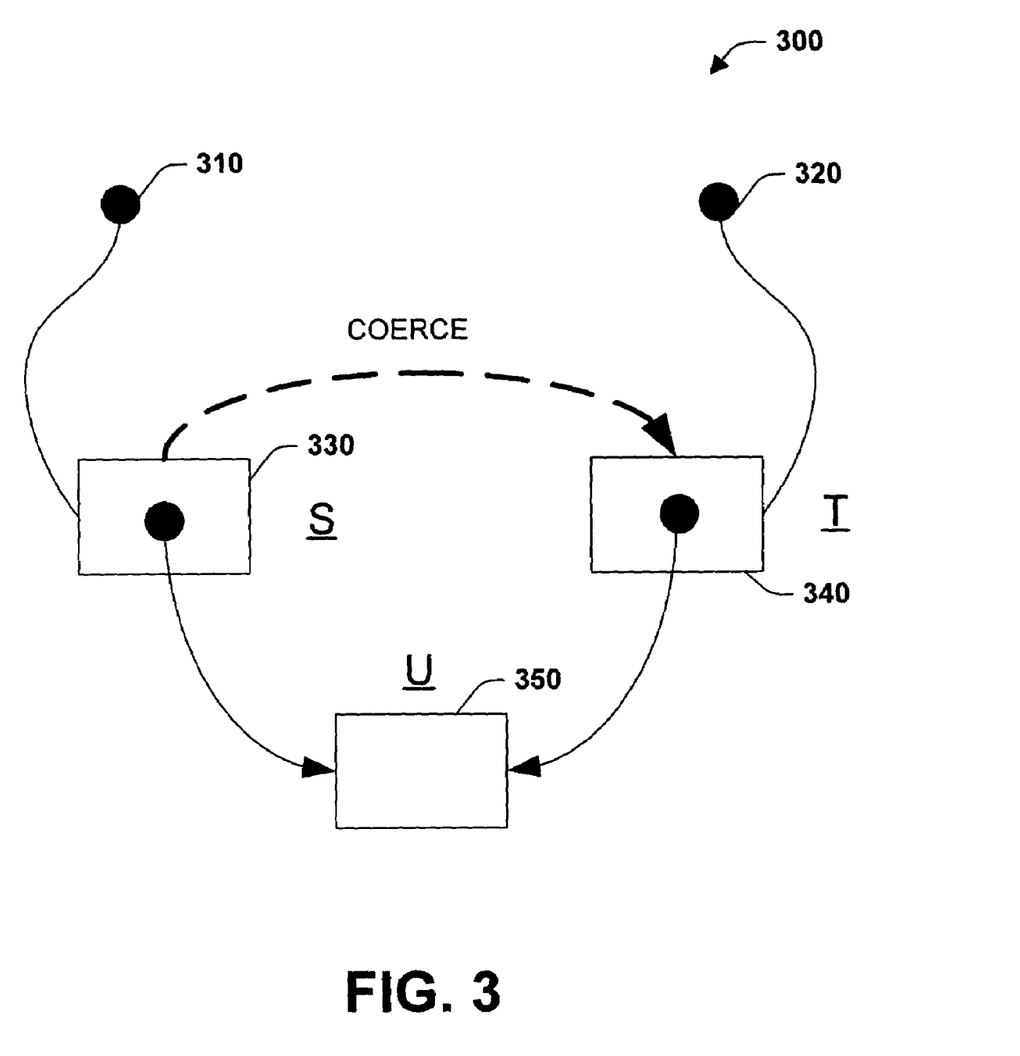
FIG. 3 is a schematic block diagram illustrating employment of a universal type in accordance with an aspect of the present invention.

Turning to FIG. 3, a block diagram illustrates explicit type coercion in accordance with an aspect of the present invention. FIG. 3 comprises S-wrappee 310, T-wrappee 320, S-adapter 330, T-adapter 340, and universal type 350. Both the S-wrappee 310, and the T-wrappee 320 are shown wrapped by adapter 330. The wrapping process preserves the identity of the element. The coercion initiated by the source type system, described above, is shown here by the dashed arrow from S-adapter 330 to T-adapter 340. It is important to note that the wrappers in the present invention are alias preserving wrappers, meaning they preserve value identity. Additionally, all side-effecting operations are performed on the wrappee, so that the side-effects are shared between all wrappers of the same wrappee. For example, if class Foo extends class Bar, class Foo is said to be a subtype of class Bar. If Foo is then up-cast to Bar, nothing happens to the pointer, the target system simply views Foo as Bar. Therefore, the representation of an element does not change, only the systems view of the element changes. Also, it should be noted that since no information is lost when casting Foo to Bar, the system can also downcast the value from Bar to Foo.

In some runtime environments (e.g., Common Language Runtime (CLR)) type identity is confined to an assembly where the type is defined. For example, if there are two assemblies, where int n is declared in one assembly and mapped to a type T and int n is defined in a second assembly and mapped to type T, there is no relationship between type T in the first assembly and type T in the second assembly. However, the implementation of structural subtyping necessitates a resolution of this cross-assembly problem. Therefore, a universal type 350 is introduced that represents the family of types, which the subtype and the supertype are members. By employing this universal type 350 the wrappee can be wrapped by equivalent types originating in different assemblies.

Figure 4:
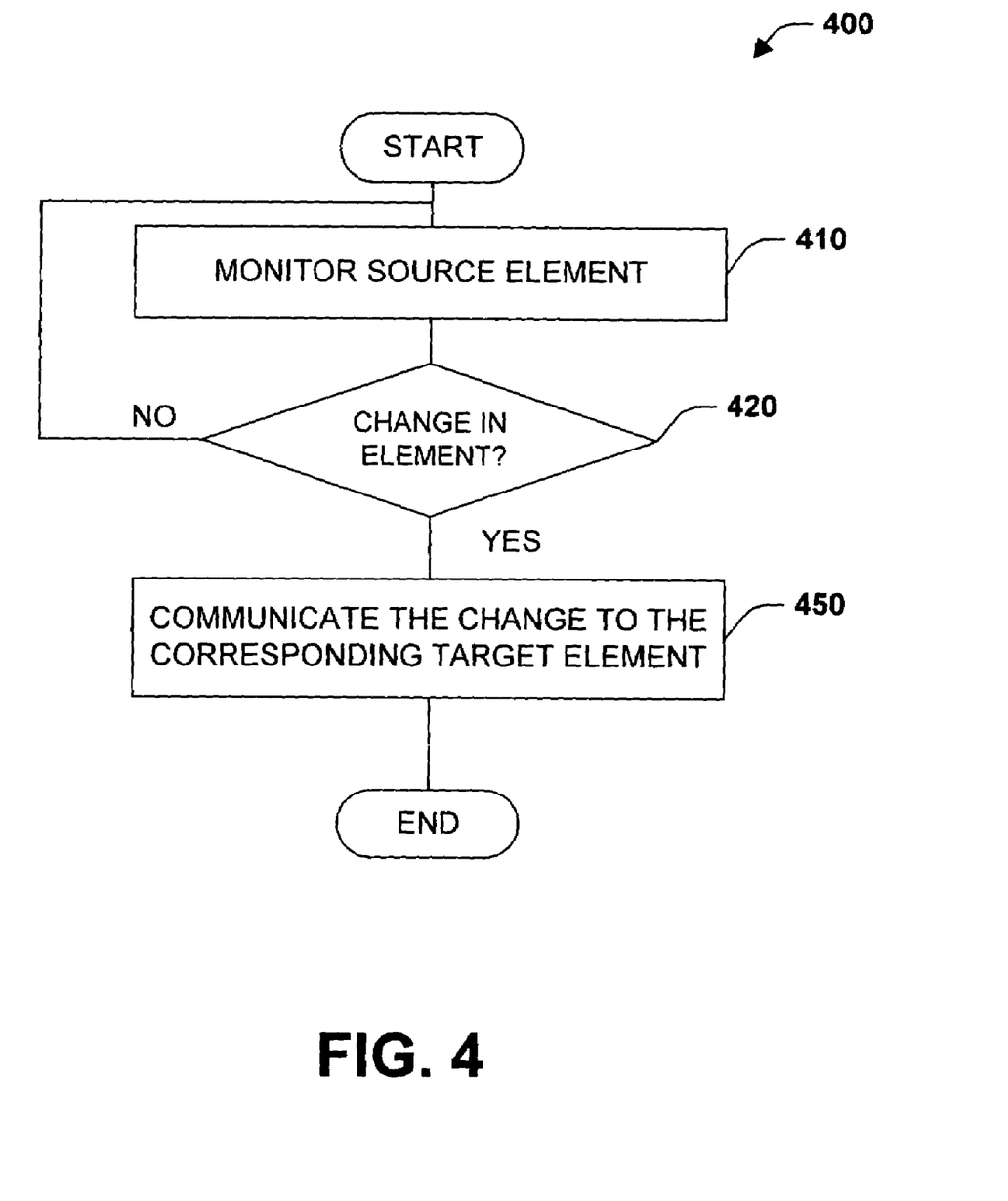
FIG. 4 is a flow diagram illustrating a method of maintaining reference identity in accordance with an aspect of the present invention.

FIG. 4 is a flow diagram depicting a method 400 of maintaining reference identity in a nominal type runtime environment in accordance with an aspect of the present invention. At 410, the source element or value is monitored. A check is performed at 420 to determine whether there has been a change in the element. If no, the system goes back to 410 to monitor the source element. If a change has occurred to the source element (e.g., value change as a result of an assignment), the change is communicated to the associated target element in the target system via the wrappee and adapter, as shown at 450.

Figure 5:
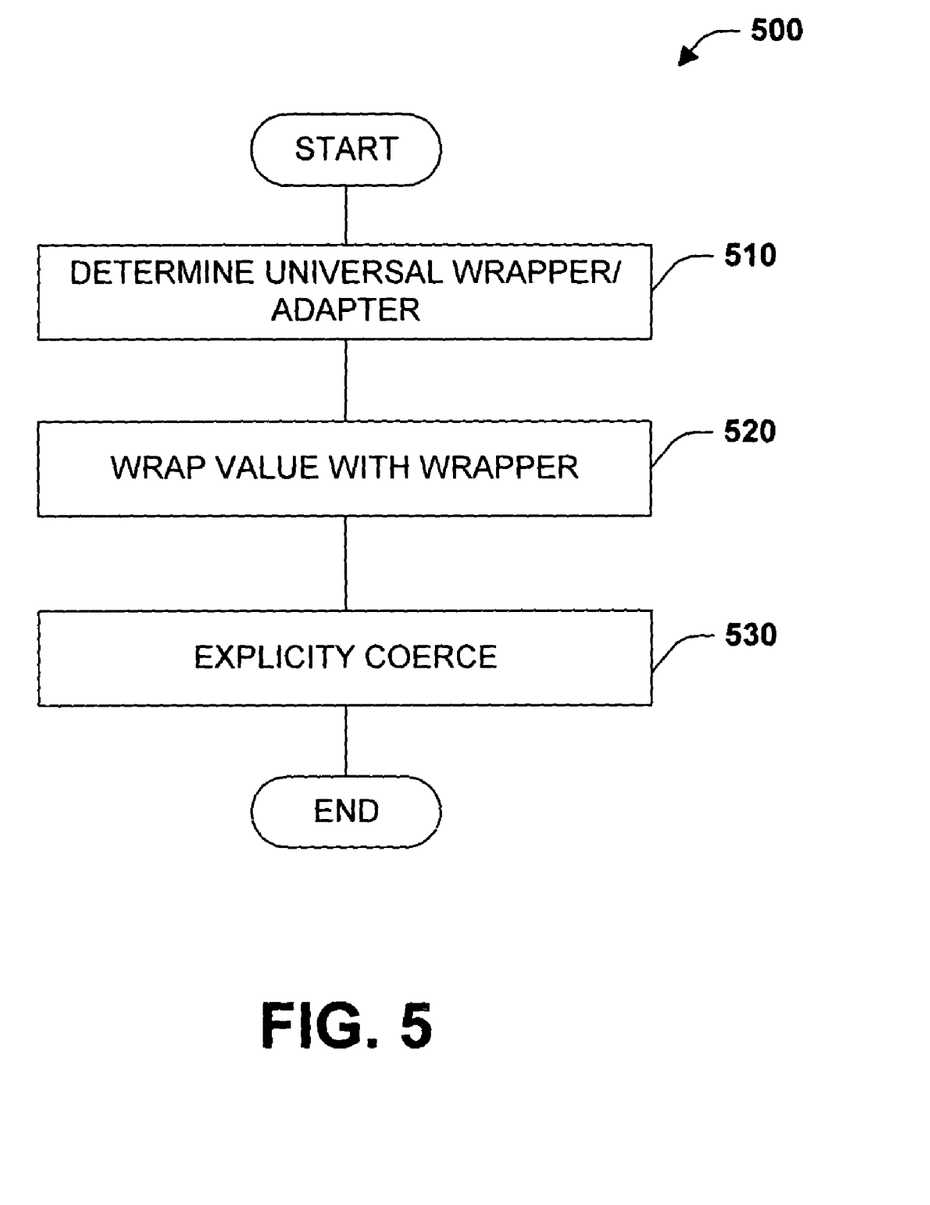
FIG. 5 is a flow diagram depicting a method of casting values in a structural type language executed in a nominal type environment in accordance with an aspect of the present invention.

Referring to FIG. 5, a flow diagram is illustrated depicting a method 500 of casting values in a structural type language executed in a nominal type environment. At 510, a universal wrapper is determined such that the subtype and supertype are members. Next, at 520 the universal wrapper is applied to the value. Finally, at 530 the value is explicitly coerced.

Figure 6:
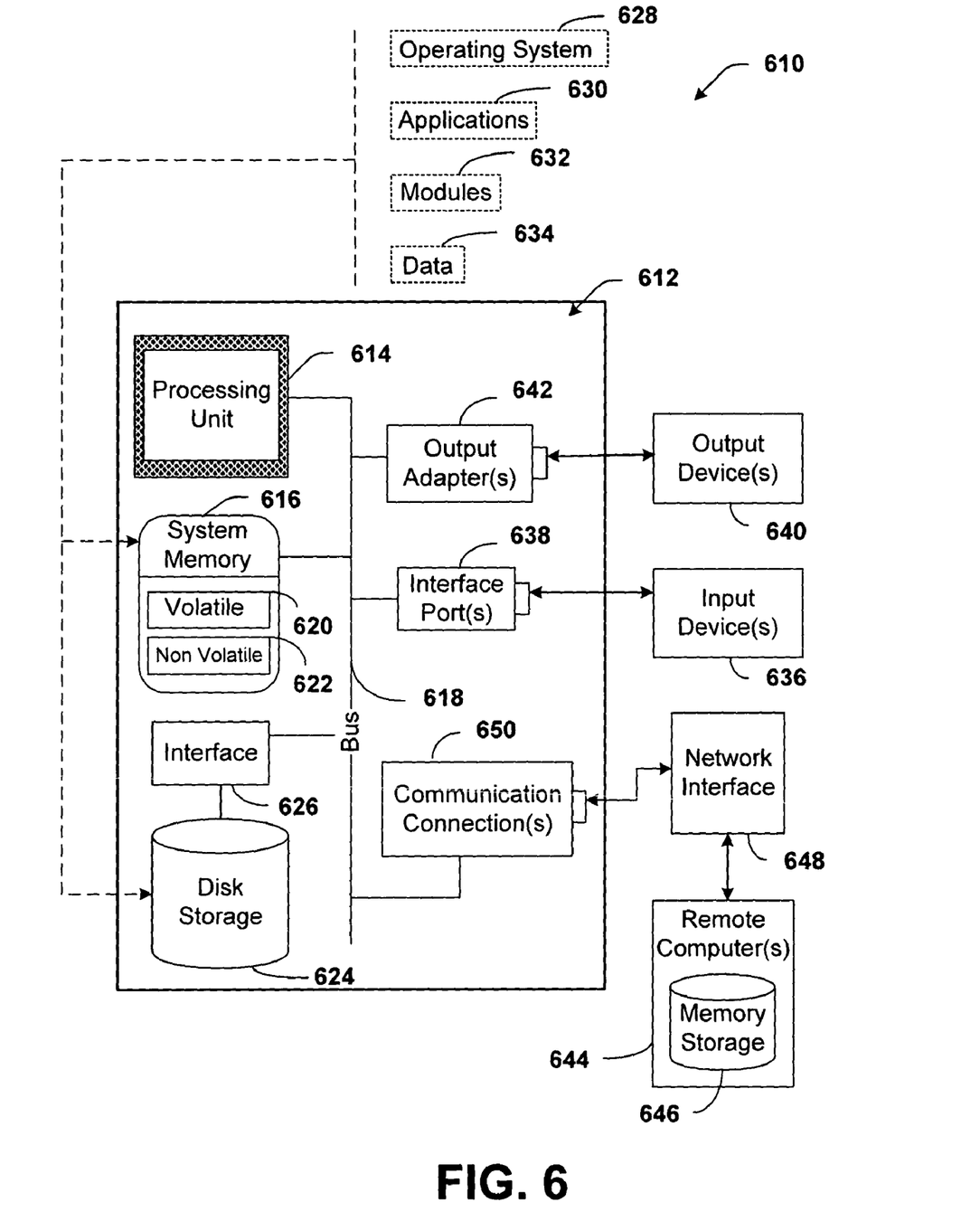
FIG. 6 is a schematic block diagram illustrating a suitable operating environment in accordance with an aspect of the present invention.
Figure 7:
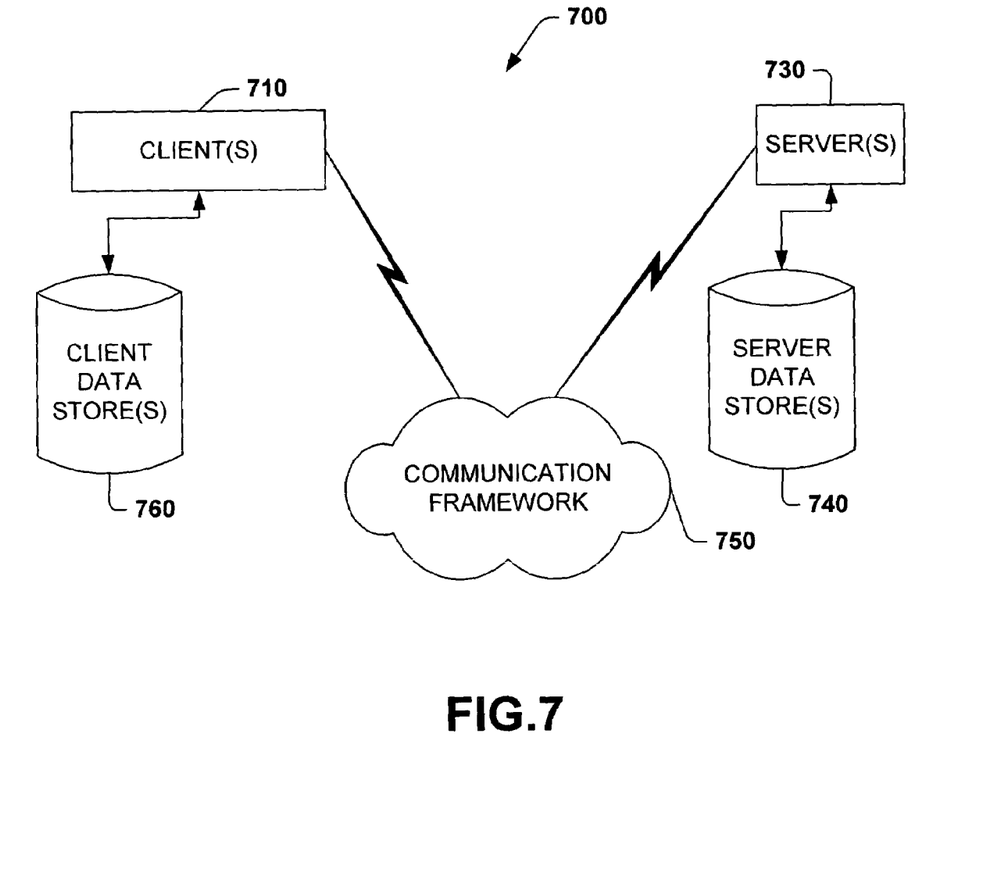
FIG. 7 is a schematic block diagram of a sample-computing environment with which the present invention can interact.

In order to provide a context for the various aspects of the invention, FIGS. 6 and 7 as well as the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, mini-computing devices, mainframe computers, as well as personal computers, hand-held computing devices, microprocessor-based or programmable consumer electronics, and the like. The illustrated aspects of the invention may also be practiced in distributed computing environments where task are performed by remote processing devices that are linked through a communications network. However, some, if not all aspects of the invention can be practices on stand alone computers. In a distributed computing environment, program modules may be locate in both local and remote memory storage devices.

With reference to FIG. 6, an exemplary environment 610 for implementing various aspects of the invention includes a computer 612. The computer 612 includes a processing unit 614, a system memory 616, and a system bus 618. The system bus 618 couples system components including, but not limited to, the system memory 616 to the processing unit 614. The processing unit 614 can be any of various available processors. Dual microprocessors and other multiprocessor architectures also can be employed as the processing unit 614.

The system bus 618 can be any of several types of bus structure(s) including the memory bus or memory controller, a peripheral bus or external bus, and/or a local bus using any variety of available bus architectures including, but not limited to, 11-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCM-CIA), and Small Computer Systems Interface (SCSI).

The system memory 616 includes volatile memory 620 and nonvolatile memory 622. The basic input/output system (BIOS), containing the basic routines to transfer information between elements within the computer 612, such as during start-up, is stored in nonvolatile memory 622. By way of illustration, and not limitation, nonvolatile memory 622 can include read only memory (ROM), programmable ROM (PROM), electrically programmable ROM (EPROM), electrically erasable ROM (EEPROM), or flash memory. Volatile memory 620 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 612 also includes removable/non-removable, volatile/non-volatile computer storage media. FIG. 6 illustrates, for example a disk storage 624. Disk storage 624 includes, but is not limited to, devices like a magnetic disk drive, floppy disk drive, tape drive, Jaz drive, Zip drive, LS-120drive, flash memory card, or memory stick. In addition, disk storage 624 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 624 to the system bus 618, a removable or non-removable interface is typically used such as interface 626.

It is to be appreciated that FIG. 6 describes software that acts as an intermediary between users and the basic computer resources described in suitable operating environment 610. Such software includes an operating system 628. Operating system 628, which can be stored on disk storage 624, acts to control and allocate resources of the computer system 612. System applications 630 take advantage of the management of resources by operating system 628 through program modules 632 and program data 634 stored either in system memory 616 or on disk storage 624. It is to be appreciated that the present invention can be implemented with various operating systems or combinations of operating systems.

A user enters commands or information into the computer 612 through input device(s) 636. Input devices 636 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 614 through the system bus 618 via interface port(s) 638. Interface port(s) 638 include, for example, a serial port, a parallel port, a game port, and a universal serial bus (USB). Output device(s) 640 use some of the same type of ports as input device(s) 636. Thus, for example, a USB port may be used to provide input to computer 612, and to output information from computer 612 to an output device 640. Output adapter 642 is provided to illustrate that there are some output devices 640 like monitors, speakers, and printers, among other output devices 640, that require special adapters. The output adapters 642 include, by way of illustration and not limitation, video and sound cards that provide a means of connection between the output device 640 and the system bus 618. It should be noted that other devices and/or systems of devices provide both input and output capabilities such as remote computer(s) 644.

Computer 612 can operate in a networked environment using logical connections to one or more remote computers, such as remote computer(s) 644. The remote computer(s) 644 can be a personal computer, a server, a router, a network PC, a workstation, a microprocessor based appliance, a peer device or other common network node and the like, and typically includes many or all of the elements described relative to computer 612. For purposes of brevity, only a memory storage device 646 is illustrated with remote computer(s) 644. Remote computer(s) 644 is logically connected to computer 612 through a network interface 648 and then physically connected via communication connection 650. Network interface 648 encompasses communication networks such as local-area networks (LAN) and wide-area networks (WAN). LAN technologies include Fiber Distributed Data Interface (FDDI), Copper Distributed Data Interface (CDDI), Ethernet/IEEE 1102.3, Token Ring/IEEE 1102.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 650 refers to the hardware/software employed to connect the network interface 648 to the bus 618. While communication connection 650 is shown for illustrative clarity inside computer 612, it can also be external to computer 612. The hardware/software necessary for connection to the network interface 648 includes, for exemplary purposes only, internal and external technologies such as, modems including regular telephone grade modems, cable modems and DSL modems, ISDN adapters, and Ethernet cards.

FIG. 7 is a schematic block diagram of a sample-computing environment 700 with which the present invention can interact. The system 700 includes one or more client(s) 710. The client(s) 710 can be hardware and/or software (e.g., threads, processes, computing devices). The system 700 also includes one or more server(s) 730. The server(s) 730 can also be hardware and/or software (e.g., threads, processes, computing devices). The servers 730 can house threads to perform transformations by employing the present invention, for example. One possible communication between a client 710 and a server 730 may be in the form of a data packet adapted to be transmitted between two or more computer processes. The system 700 includes a communication framework 750 that can be employed to facilitate communications between the client(s) 710 and the server(s) 730. The client(s) 710 are operably connected to one or more client data store(s) 760 that can be employed to store information local to the client(s) 710. Similarly, the server(s) 730 are operably connected to one or more server data store(s) 740 that can be employed to store information local to the servers 730.

What has been described above includes examples of the present invention. It is, of course, not possible to describe every conceivable combination of components or methodologies for purposes of describing the present invention, but one of ordinary skill in the art may recognize that many further combinations and permutations of the present invention are possible. Accordingly, the present invention is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system that employs structural types in a nominal typed runtime environment comprising:
    a component that receives source elements defined in a structural type programming language;
    a component that receives target elements defined in a nominal type runtime environment;
    an adapter that facilitates communication between the source elements and the target elements and explicitly coerces a value on the target elements, the adapter comprises a wrappee, the wrappee includes a copy of the source elements; and
    a memory operatively coupled to a processor retains at least a portion of the component that receives source elements, the component that receives target elements, the adapter, or a combination thereof.

2. The system of claim 1, the runtime environment supports multiple languages.

3. The system of claim 2, the runtime environment is platform independent.

4. The system of claim 1, the adapter is a transparent two-way adapter.

5. The system of claim 1, the adapter facilitates the use of aliases.

6. A computer-implemented system that employs structural types in a nominal typed runtime environment, comprising:
    a component that receives source elements defined in a structural type programming language;
    a component that receives target elements defined in a nominal type runtime environment, that supports multiple languages and is platform independent;
    an adapter that facilitates communication between the source elements and the target elements and explicitly coerces a value on the target elements, the adapter is a transparent two-way adapter that facilitates the use of aliases and that comprises a wrappee, the wrappee includes a copy of the source elements; and a processor operatively coupled to memory executes an instruction in relation to the component that receives source elements, the component that receives target elements, the adapter, or a combination thereof.

* * * * *